Aug. 10, 1948. A. M. ROTHBARDT 2,446,721
MINIATURE STEERING WHEEL
Filed April 28, 1947
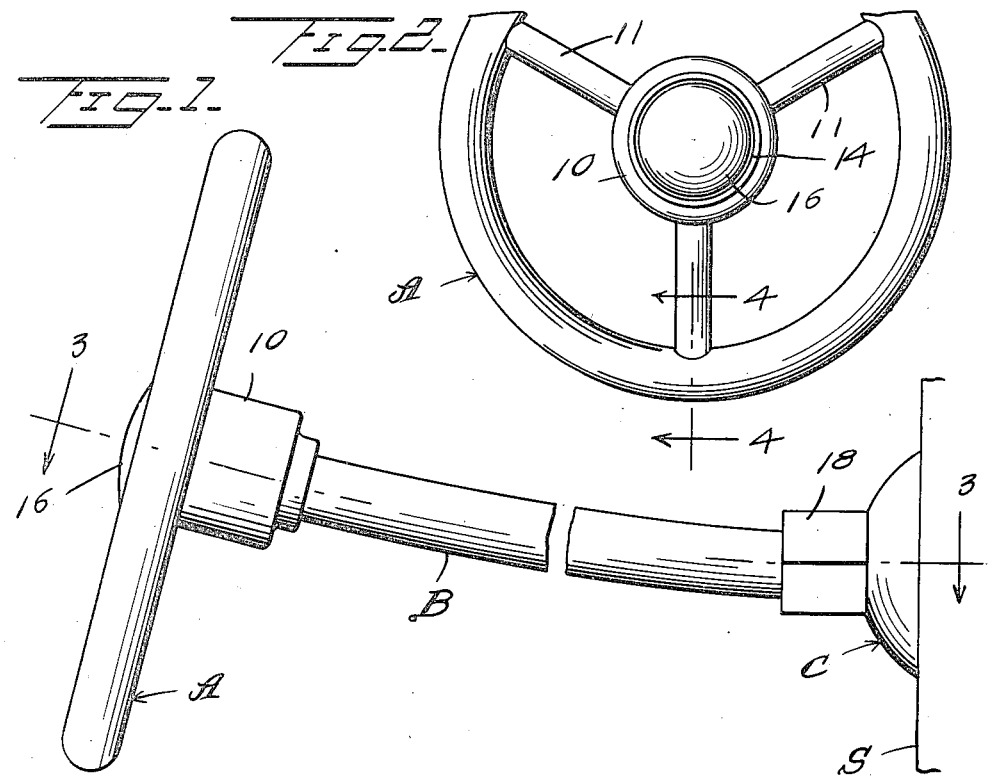
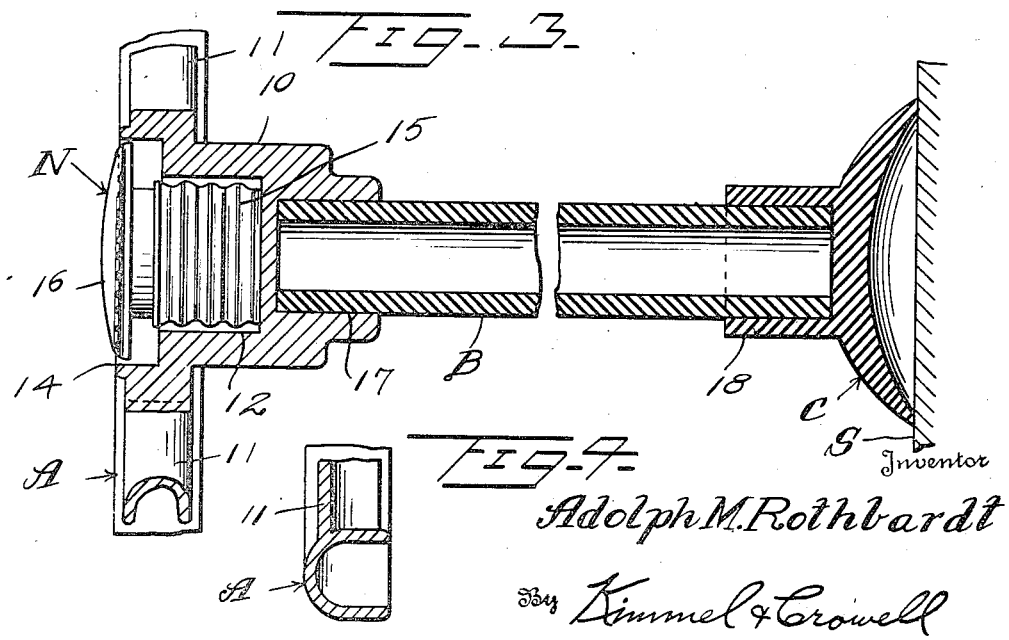
Inventor
Adolph M. Rothbardt
By Kimmel & Crowell
Attorneys Patented Aug. 10, 1948

2,446,721

UNITED STATES PATENT OFFICE 2,446,721

MINIATURE STEERING WHEEL

Adolph Martin Rothbardt, Chicago, Ill., assignor to Statler Mfg. Co., Chicago, Ill., a corporation of Illinois Application April 28, 1947, Serial No. 744,366

3 Claims. (Cl. 46—1)

This invention relates to toy steering wheels.

More particularly, the invention is concerned with the provision of a steering wheel assembly for educational and amusement purposes, especially by children, although not limited thereto.

The steering wheel and related parts comprising my invention is adaptable for use in an automobile, or other vehicle, either actual or simulated, such as boats, aircraft, trucks and the like, and will give the user the impression of actually steering the real or toy vehicle to which the device is for the time of use attached.

A further object of this invention is to provide a device of this character described, which includes a novel arrangement for simulating a horn or the like, or in brief, a noise maker actuated like the usual steering wheel horn button, but entirely mechanical.

Another object of this invention is to provide a toy or simulated steering device, partly or wholly made of flexible material, such as for example rubber, although not restricted thereto, which is sufficiently flexible to prevent injury to the user in the event the latter is pushed or thrown thereagainst.

A further object of this invention is to provide a device of this kind which may be readily and easily attached to, or detached from a desired supporting surface without injury to the latter, as for example, a dashboard of a motor vehicle.

Another object of this invention is to provide a device of the kind described, consisting essentially of a suction cup attaching means, a flexible supporting extension, a plastic, wood, aluminum or a bendable or flexible wheel, and a noise making element carried within a portion of the wheel, preferably centrally thereof.

Other objects are to provide a toy or simulated steering mechanism which is safe for use by children, easy and cheap to manufacture, durable, strong, and simple in construction.

Further objects will be apparent from the description, drawings, and claims forming a part of this application, the device illustrated being by way of example, and not as a limitation, except to the extent of the scope of the claims.

In the drawings,

Figure 1 is a side elevational view of one form of this invention, with a part broken away to illustrate that the length of the supporting post for the wheel is optional, Figure 2 is a top plan view of the steering wheel, partly broken away, Figure 3 is a longitudinal sectional view of the device, taken on line 3—3 of Figure 1, Figure 4 is a fragmentary detail view of a portion of the steering wheel.

Referring now to Figure 1, it will be seen that the device consists of a steering wheel element A, a supporting post B, and a suction cup element C, for attaching the device to a dashboard or other attachment surface, the surface in this case being referred to generally as S. Within the hub of the wheel A, is a noise making element referred to generally as N.

The steering wheel element A is formed of a resilient annular rubber body supported from the hub 10 by resilient or rubber spokes 11. The cross section of the steering wheel A and arms 11 are U-shaped, with the open end extending downwardly or toward the attaching element C. In this manner a light construction is provided while maintaining a substantially rigid structure which is resilient or yieldable, to prevent injury to the persons using this device, or to any parts of the automobile with which it will come in contact.

The hub 10 is formed with a recess 12 which opens outwardly from the wheel A, and an annular recess 14 of a larger diameter than the recess 12 is provided on the outer edge of the hub 10.

The noise maker N is housed within the openings 12 and 14. The noise maker N is formed with a bellows air chamber 15, spring-pressed to its expanded position, and has an annular plate 16 fixed to the outer end of the bellows which carries a reed, not shown in the drawing, or other suitable noise making device.

The outer end of the plate 16 is convex to resemble the horn button of the regular steering wheel. The post B which supports the steering wheel from the floor or dashboard of the automobile is made of rubber or other resilient material and is tubular to provide a light structure. One end of the post B is frictionally fit or engaged in an opening 17 on the back end of the hub 10.

The suction cup C is formed in the conventional manner for attachment to any smooth flat surface, and is provided with an attaching boss 18 on the outer side thereof. The boss 18 is formed with a central opening in which the lower end of the supporting post B is engaged.

In the use and operation, the suction cup which may be moistened if desired, to make a more airtight contact with the supporting surface, is first attached to the latter by a firm pressure. The operator then grasps the steering wheel element and, due to its flexibility as well as the flexibility of the supporting post, the wheel is partially rotated, thus simulating the effect of an actual steering mechanism. The noise making element is operated in the manner customary to use of an ordinary steering wheel located automobile horn button, that is, by pressing upon it. However, since in this case the noise is produced by the mechanical device illustrated, the button has to be sharply depressed and released to produce the noise. It will be understood that it is within the purview of this invention to substitute other suitable noise producing means.

The supporting post, consisting as it does in this instance of a length of rubber hose, is sufficiently flexible to allow practically universal directional movement of the wheel for positioning the same in the most desirable angle and point of use. Thus, the wheel may be held on a downward angle or any angle desired, although as shown herein, it is on an upward slant.

While as referred to herein, the wheel element is described as being made of rubber or flexible material it will be understood that it can be made also of plastic, or wood, or aluminum, or other suitable materials with good results.

I do not mean to confine myself to the exact details of construction herein disclosed, but claim all variations falling within the purview of the appended claims.

What I claim is:

1. A steering wheel toy comprising a steering wheel having a hub, with a rim outwardly spaced from said hub by a plurality of radially spaced spokes integrally extending between said hub and said rim, said hub having a front opening, a toy noise making means housed within said front opening, an operating member attached to said noise making means substantially closing said front opening, said hub having a rearward extension with a rear opening, a post made of resilient flexible material, said post having one end extending within said rear opening and removably secured therein, a suction attaching cup having a hollow boss, the other end of said post extending within said hollow boss and removably secured therein, said suction attaching cup adapted to be removably and instantly attached to any substantially flat surface of sufficient area to receive it so as to permit a child to operate the wheel in simulated driving operations, said post adapted upon pressure on the steering wheel by the child to flex and permit limited lateral and radial movement of the steering wheel.

2. A steering wheel toy comprising a steering wheel having a hub with a rim outwardly spaced from said hub by a plurality of radially spaced spokes extending between said hub and said rim, said hub having a rearward extension with a rear opening, a post made of resilient flexible material, said post having one end extending within said rear opening and removably secured therein, a suction attaching cup having a hollow boss, the other end of said post extending within said hollow boss and removably secured therein, said suction attaching cup adapted to be removably and instantly attached to any substantially flat surface of sufficient area to receive it so as to permit a child to operate the wheel in simulated driving operations, said post adapted upon pressure on the steering wheel by the child to flex and permit limited lateral and radial movement of the steering wheel.

3. A steering wheel toy comprising a steering wheel having a hub with a rim outwardly spaced from said hub by a plurality of radially spaced spokes extending between said hub and said rim, said hub having a rearward extension with a rear opening, a post made of resilient flexible tubular material of substantially uniform cross section throughout its length, said post having one end extending within said rear opening and removably secured therein, a suction attaching cup having a hollow boss, the other end of said post extending within said hollow boss and removably secured therein, said suction attaching cup adapted to be removably and instantly attached to any substantially flat surface of sufficient area to receive it so as to permit a child to operate the wheel in simulated driving operations, said post adapted upon pressure on the steering wheel by the child to flex and permit limited lateral and radial movement of the steering wheel.

ADOLPH MARTIN ROTHBARDT.

REFERENCES CITED

The following references are of record in the file of this patent:

UNITED STATES PATENTS

| Number | Name | Date |
|---|---|---|
| 1,556,076 | Chambers | Oct. 6, 1925 |
| 1,910,455 | Williams | May 23, 1933 |
| 1,922,746 | Reeder | Aug. 15, 1933 |
| 2,128,435 | Shippee et al. | Aug. 30, 1938 |
| 2,189,853 | Zadek | Feb. 13, 1940 |
| 2,243,912 | Legler | June 3, 1941 |

FOREIGN PATENTS

| Number | Country | Date |
|---|---|---|
| 524,813 | Great Britain | Aug. 15, 1940 |